United States Patent
Kodaira et al.

(10) Patent No.: US 12,109,744 B2
(45) Date of Patent: Oct. 8, 2024

(54) MOLD FOR MOLDING SYSTEM

(71) Applicant: Canon Virginia, Inc., Newport News, VA (US)

(72) Inventors: Koki Kodaira, Tokyo (JP); Yuichi Yanahara, Moriyama (JP)

(73) Assignee: Canon Virginia, Inc., Newport News, VA (US)

( * ) Notice: Subject to any disclaimer, the term of this patent is extended or adjusted under 35 U.S.C. 154(b) by 0 days.

(21) Appl. No.: 17/587,382

(22) Filed: Jan. 28, 2022

(65) Prior Publication Data

US 2022/0250293 A1 Aug. 11, 2022

Related U.S. Application Data

(60) Provisional application No. 63/147,523, filed on Feb. 9, 2021.

(51) Int. Cl.
*B29C 45/04* (2006.01)
*B29C 45/33* (2006.01)

(52) U.S. Cl.
CPC .......... *B29C 45/0433* (2013.01); *B29C 45/33* (2013.01)

(58) Field of Classification Search
CPC .............. B29C 45/1761; B29C 45/376; B29C 45/0082; B29C 2045/033; B29C 45/04; B29C 45/12
See application file for complete search history.

(56) References Cited

U.S. PATENT DOCUMENTS

| | | | |
|---|---|---|---|
| 4,810,181 A * | 3/1989 | Ozawa | B29C 45/641 425/589 |
| 11,104,050 B2 | 8/2021 | Nakamura | |
| 2006/0172039 A1* | 8/2006 | Imai | B29C 45/64 425/595 |
| 2018/0009146 A1* | 1/2018 | Nakamura | B29C 45/80 |

FOREIGN PATENT DOCUMENTS

| | | |
|---|---|---|
| JP | H03-142208 A | 6/1991 |
| JP | 05-096548 A | 4/1993 |
| JP | H09-039036 A | 2/1997 |
| JP | H09-076288 A | 3/1997 |
| JP | 2009039876 A | 2/2009 |
| JP | 6121601 B1 | 4/2017 |
| WO | WO-2020023212 A1 * | 1/2020 ......... B29C 45/0408 |

OTHER PUBLICATIONS

Nitta, English Translation of JPH0939036A (Year: 1995).*
Nakamura (English Translation of JP2019081346) (Year: 2019).*

* cited by examiner

*Primary Examiner* — Michael A Tolin
*Assistant Examiner* — Hana C Page
(74) *Attorney, Agent, or Firm* — Canon U.S.A., Inc. IP Division

(57) ABSTRACT

A mold for injection molding, the mold comprising a first member, a second member configured to form a first cavity corresponding to a first molded part by combining the second member with the first member, and wherein the improvement to the mold includes a third member configured to form a second cavity corresponding to a second molded product by combining the third member with the first member.

20 Claims, 9 Drawing Sheets

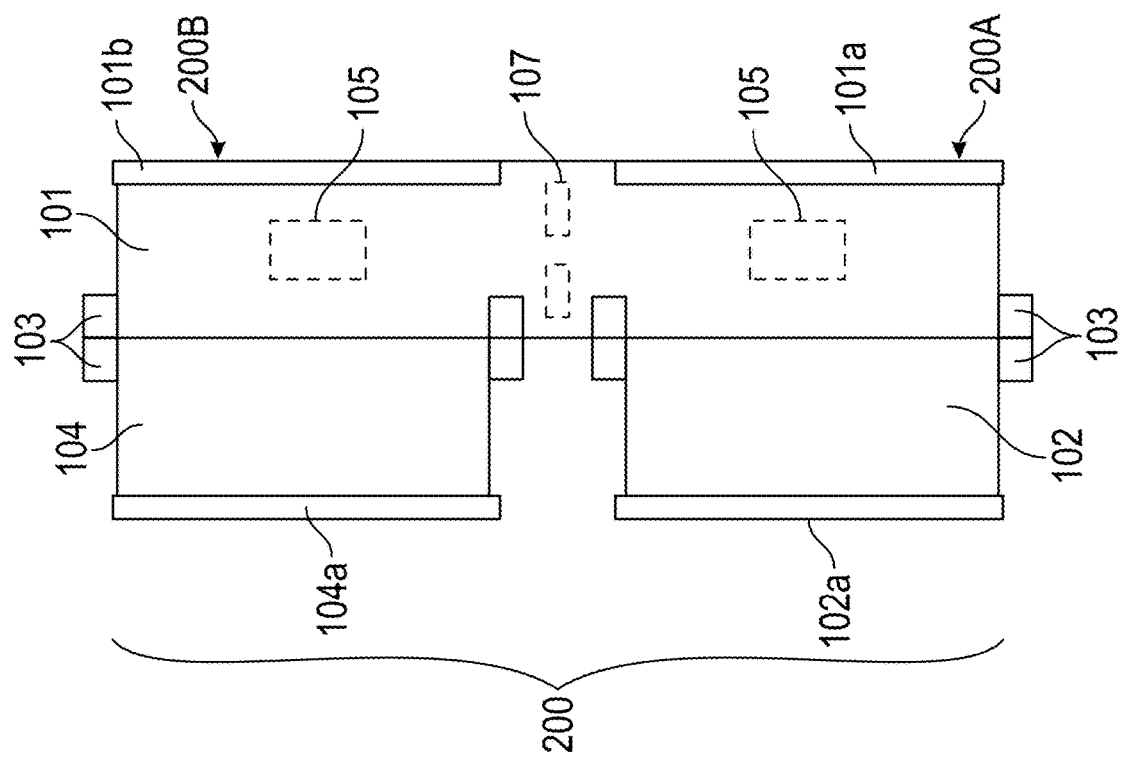
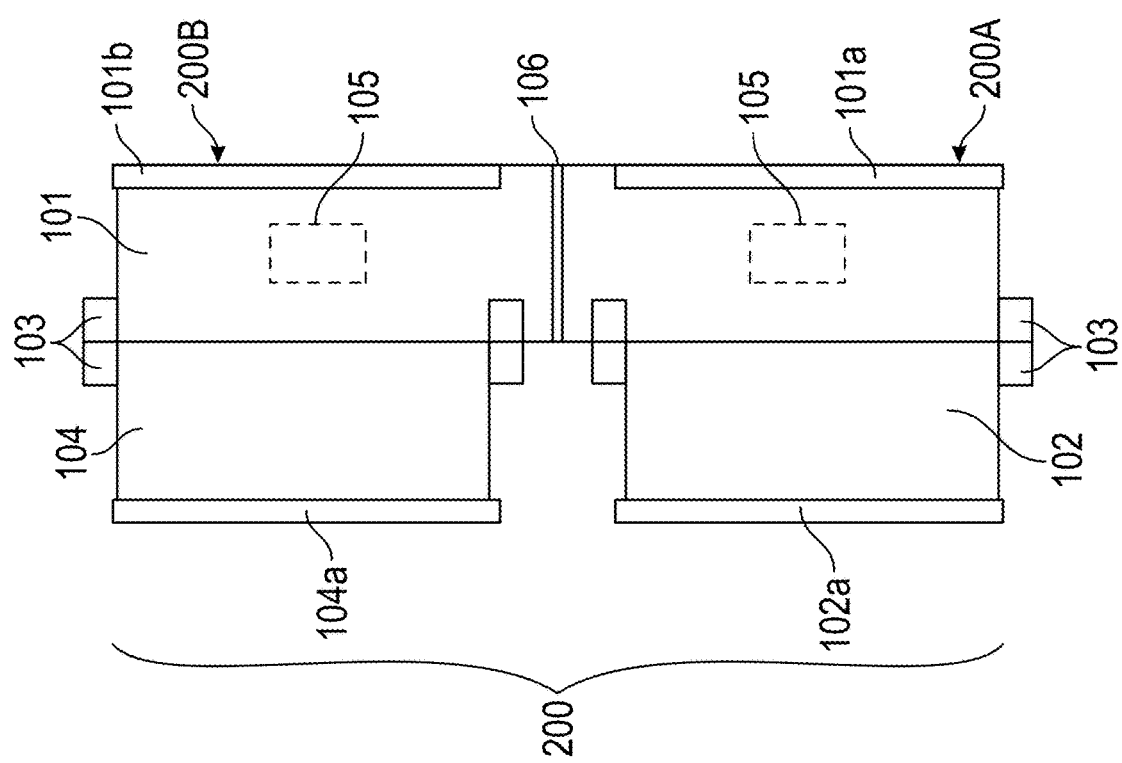

MOLD FOR MOLDING SYSTEM

CROSS-REFERENCE TO RELATED APPLICATION

This application claims the benefit of U.S. Provisional Application 63/147,523, which was filed on Feb. 9, 2021.

FIELD

The present disclosure related to a mold for injection molding.

BACKGROUND

Manufacturing of molded parts by an injection molding machine includes injecting a resin into a mold after clamping the mold, pressing the resin into the mold at a high pressure in order to compensate for a volume decrease due to solidification of the resin, keeping the molded part in the mold until the resin solidifies, and ejecting the molded part from the mold. The injection molding process is repeatedly performed to obtain a desired number of molded parts. After a predetermined number of moldings are performed with one mold, the mold is ejected from the injection molding machine, the next mold is setup, the next mold is inserted into the injection molding machine, and then the predetermined number of injection moldings with the next mold is performed.

In the above-described molding approach, a method that uses two molds with one injection molding machine has been proposed. For example, US 2018/0009146/Japanese patent publication No. 2018-001738/VN20160002505 are seen to discuss a system in which conveying machines are arranged on both sides of an injection molding machine. FIG. 1 illustrates an injection molding system of US 2018/0009146/Japanese patent publication No. 2018-001738/VN20160002505. In this system, a mold is moved between a molding operation position where resin is injected and a molded part is taken out, and a cooling position where the resin injected into the mold is cooled.

Productivity of a system such as the one illustrated on FIG. 1 is typically tied to shortening the time required for conveying the molds as much as possible. What is needed is a way to shorten the mold conveyance time with as little cost increase as possible to the overall injection molding system.

SUMMARY

One exemplary aspect of the present disclosure provides a mold structure that enables shortening the mold conveyance time.

A mold for injection molding, the mold comprising a first member, a second member configured to form a first cavity corresponding to a first molded part by combining the second member with the first member, and wherein the improvement to the mold includes a third member configured to form a second cavity corresponding to a second molded product by combining the third member with the first member.

BRIEF DESCRIPTION OF THE DRAWINGS

The accompanying drawings, which are incorporated herein and form part of the specification, illustrate various embodiments, objects, features, and advantages of the present disclosure.

FIGS. 8A-8B illustrate an internal configuration of a mold.

Figure 1:
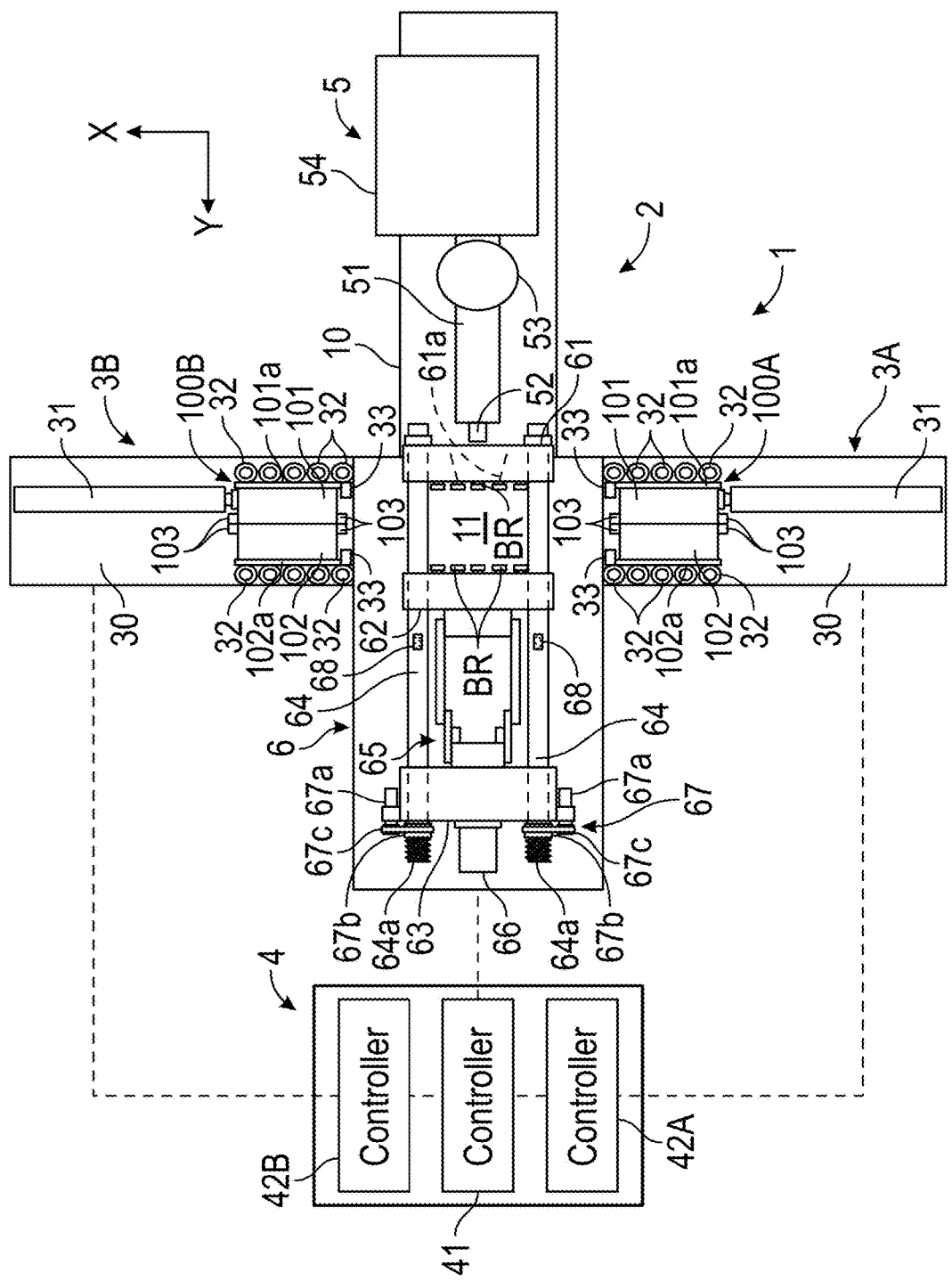
FIG. 1 illustrates an injection molding system.

Throughout the Figures, the same reference numerals and characters, unless otherwise stated, are used to denote like features, elements, components or portions of the illustrated embodiments. While the subject disclosure is described in detail with reference to the Figures, it is done so in connection with the illustrative exemplary embodiments. It is intended that changes and modifications can be made to the described exemplary embodiments without departing from the true scope and spirit of the subject disclosure as defined by the appended claims.

DESCRIPTION OF THE EMBODIMENTS

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

With reference to the drawings, an injection molding system according to an embodiment of the present disclosure will be explained. The arrow symbols X and Y in each Figure indicate horizontal directions that are orthogonal to each other, and the arrow symbol Z indicates a vertical (upright) direction with respect to the ground.

Figure 2:
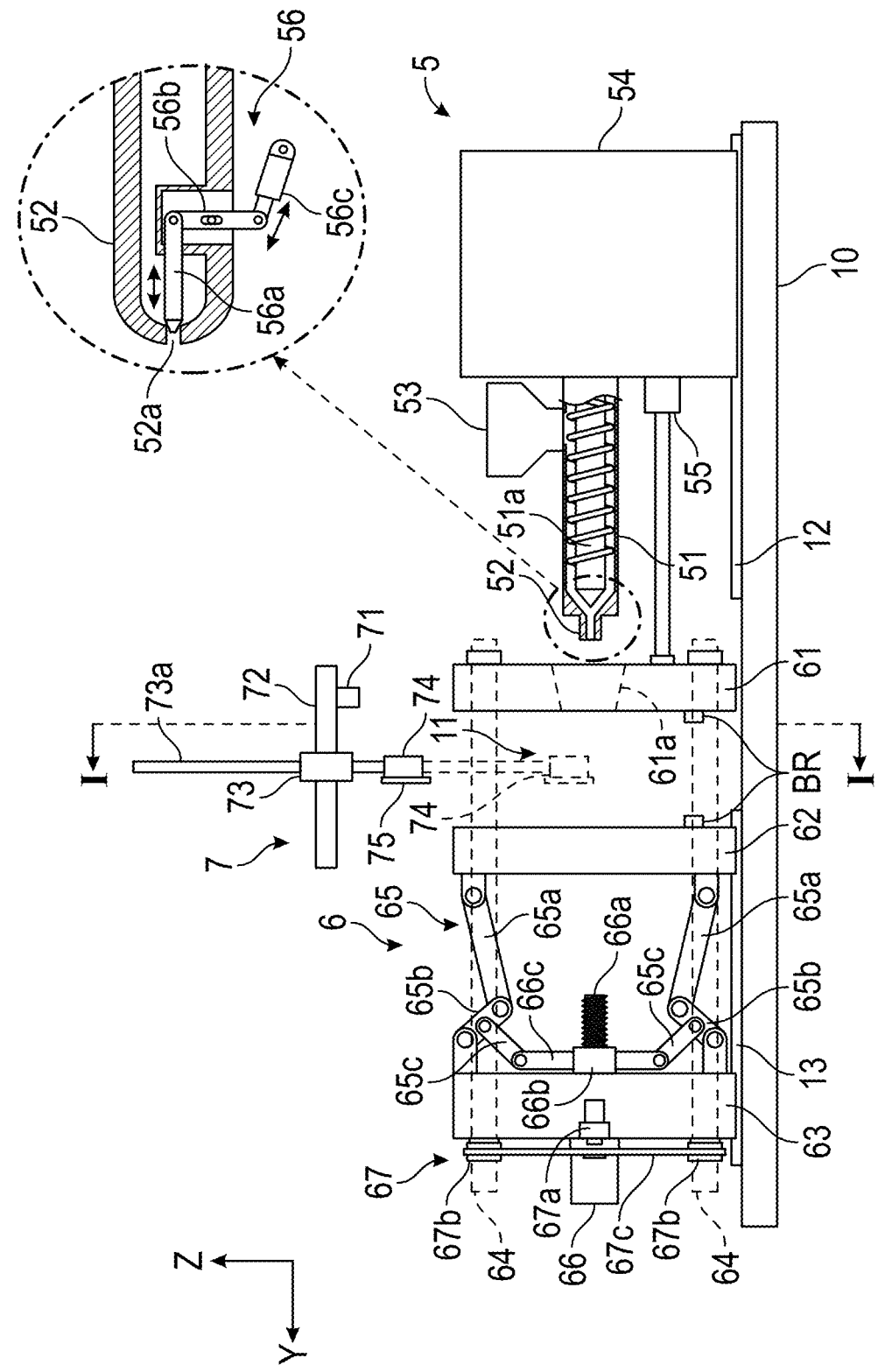
FIG. 2 is a side view of an injection molding machine.
Figure 3:
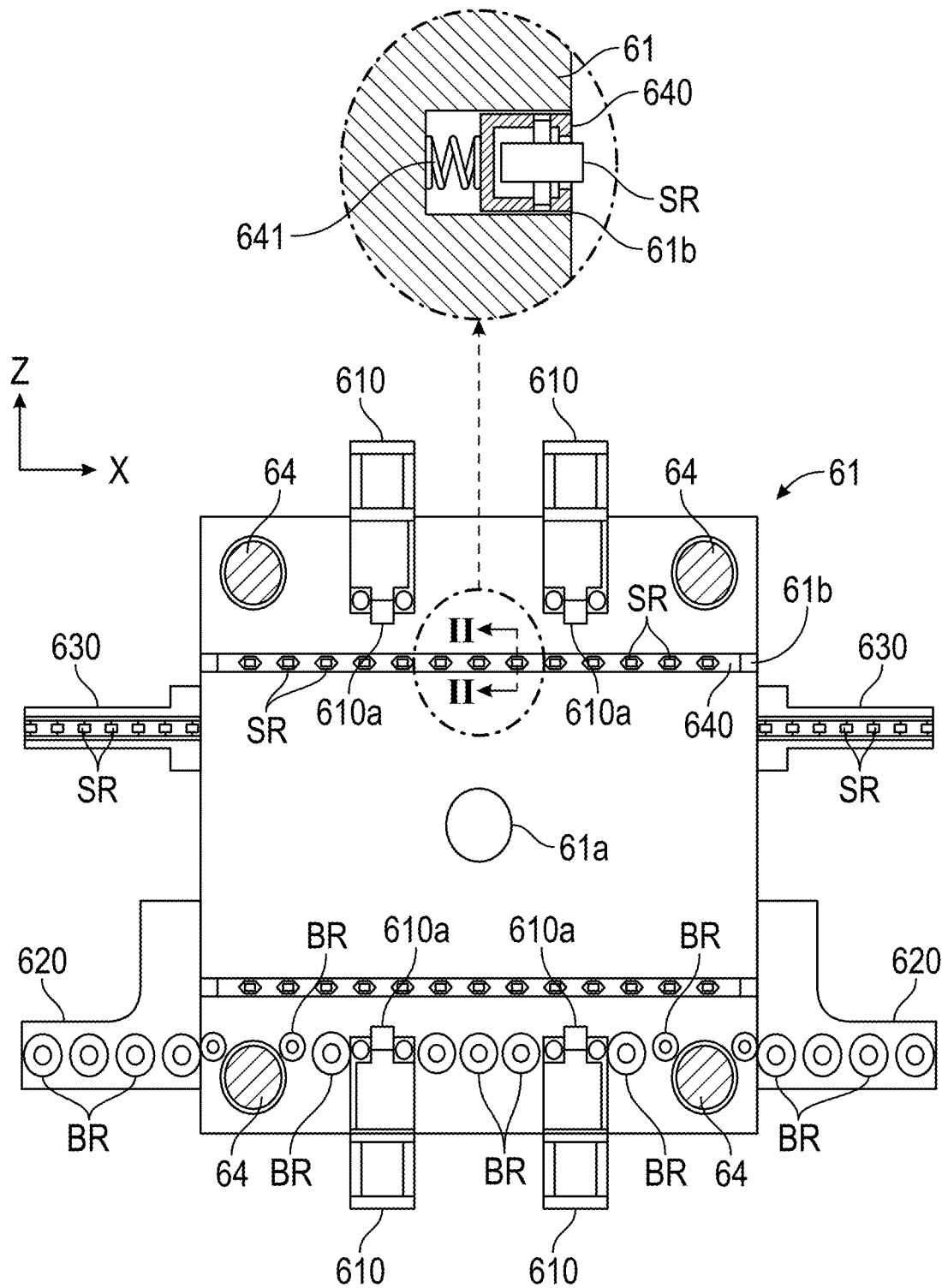
FIG. 3 is an end view of a fixed platen.

FIGS. 1-3 illustrate injection molding system 1 of US 2018/0009146/Japanese patent publication No. 2018-001738/VN20160002505 and are being provided herein for information/description purposes only.

The injection molding system 1 includes an injection molding machine 2, conveying machines 3A and 3B, and a control apparatus 4. The injection molding system 1 manufactures a molded part while alternating a plurality of molds using the conveying machines 3A and 3B for the one injection molding machine 2. Two molds, 100A and 100B are used.

The mold 100A/100B is a pair of a fixed mold 101 and a movable mold 102, which is opened/closed in relation to the fixed mold 101. The molded part is molded by injecting a molten resin into a cavity formed between the fixed mold 101 and the movable mold 102. Clamping plates 101*a* and 102*a* are respectively fixed to the fixed mold 101 and the movable mold 102. The clamping plates 101*a* and 102*a* are used to lock the mold 100A/100B to a molding operation position 11 (mold clamping position) of the injection molding machine 2.

For the mold 100A/100B, a self-closing unit 103 is provided for maintaining a closed state between the fixed mold 101 and the movable mold 102. The self-closing unit 103 enables preventing the mold 100A/100B from opening after unloading the mold 100A/100B from the injection molding machine 2. The self-closing unit 103 maintains the mold 100A/100B in a closed state using a magnetic force. The self-closing unit 103 located at a plurality of locations along opposing surfaces of the fixed mold 101 and the movable mold 102. The self-closing unit 103 is a combination of an element on the side of the fixed mold 101 and an element on the side of the movable mold 102. For the self-closing unit 103, typically two or more pair are installed for one of the molds 100A and 100B.

A conveying machine 3A loads and unloads the mold 100A onto/from the molding operation position 11 of the injection molding machine 2. A conveying machine 3B loads and unloads the mold 100B onto/from the molding operation position 11. The conveying machine 3A, the injection molding machine 2, and the conveying machine 3B are arranged to be lined up in this order in the X-axis direction. In other words, the conveying machine 3A and the conveying machine 3B are arranged laterally with respect to the injection molding machine 2 to sandwich the injection molding machine 2 in the X-axis direction. The conveying machines 3A and 3B are arranged to face each other, the conveying machine 3A is arranged on one side laterally of the injection molding machine 2, and the conveying machine 3B is arranged on the other side respectively adjacent. The molding operation position 11 is positioned between the conveying machine 3A and the conveying machine 3B. The conveying machines 3A and 3B respectively include a frame 30, a conveyance unit 31, a plurality of rollers 32, and a plurality of rollers 33.

The frame 30 is a skeleton of the conveying machine 3A and 3B, and supports the conveyance unit 31, and the pluralities of rollers 32 and 33. The conveyance unit 31 is an apparatus that moves the mold 100A/100B back and forth in the X-axis direction, and that removes and inserts the mold 100A/100B in relation to the molding operation position 11.

The conveyance unit 31 is an electrically driven cylinder with a motor as a driving source, and includes a rod that moves forward/backward in relation to the cylinder. The cylinder is fixed to the frame 30, and the fixed mold 101 is fixed to the edge portion of the rod. For the conveyance unit 31 both a fluid actuator and an electric actuator can be used, where the electric actuator can provide better precision of control of the position or the speed when conveying the mold 100A/100B. The fluid actuator can be an oil hydraulic cylinder, or an air cylinder, for example. The electric actuator can, in addition to being an electrically driven cylinder, be a rack-and-pinion mechanism with a motor as the driving source, a ball screw mechanism with a motor as the driving source, or the like.

The conveyance unit 31 is arranged independently for each of the conveying machines 3A and 3B. However, a common support member that supports the molds 100A and 100B can be used, and a single common conveyance unit 31 can be arranged for this support member. A case where the conveyance unit 31 is arranged independently for each of the conveying machines 3A and 3B enables handling cases where a movement strokes differ between the mold 100A and the mold 100B when conveying. For example, a case where molds cannot be conveyed simultaneously since the widths of the molds (the width in the X direction) differ or the thickness of the molds (the width in the Y direction) differ.

The plurality rollers 32 configure a row of rollers arranged in the X-axis direction, where two rows are configured separated in the Y-axis direction. The plurality of rollers 32 rotate around the axis of revolution in the Z-axis direction, and guide movement in the X-axis direction of the mold 100A/100B contacting the side surfaces of the mold 100A/100B (the side surfaces of the clamping plates 101a and 102a) and supporting the mold 100A/100B from the side. The plurality rollers 33 configure a row of rollers arranged in the X-axis direction, where two rows are configured separated in the Y-axis direction. The plurality of rollers 33 rotate around the axis of revolution in the Y direction, and cause movement in the X direction of the mold 100A/100B to be smooth, supporting the bottom surfaces of the mold 100A/100B (the bottom surfaces of the clamping plates 101a and 102a) and supporting the mold 100A/100B from below.

The control apparatus 4 includes a controller 41 for controlling the injection molding machine 2, a controller 42A for controlling the conveying machine 3A, and a controller 42B for controlling the conveying machine 3B. Each of the controllers 41, 42A and 42B includes, for example, a processor such as a CPU, a RAM, a ROM, a storage device such as a hard disk, and interfaces connected to sensors or actuators (not illustrated). The processor executes programs stored in the storage device. An example of a program (control) that the controller 41 executes is described below. The controller 41 is communicably connected with the controllers 42A and 42B, and provides instructions related to the conveyance of the mold 100A/100B to the controllers 42A and 42B. The controllers 42A and 42B, if loading and unloading of the mold 100A/100B terminates, transmit a signal for operation completion to the controller 41. In addition, the controllers 42A and 42B transmit an emergency stop signal at a time of an abnormal occurrence to the controller 41.

A controller is arranged for each of the injection molding machine 2, the conveying machine 3A, and the conveying machine 3B, but one controller can control all three machines. The conveying machine 3A and the conveying machine 3B can be controlled by a single controller for more reliable and collaborative operation.

FIG. 2 illustrates a side view of the injection molding machine 2. FIG. 3 illustrates an end view of a fixed platen 61, and a figure viewing from the arrow direction of the I-I line in FIG. 2. FIG. 4 illustrates a partial perspective view for describing the configuration of a periphery of the molding operation position 11.

With reference to FIG. 1 and FIG. 2, the injection molding machine 2 includes an injecting apparatus 5, a clamping apparatus 6, and a take-out robot 7 for ejecting a molded part. The injecting apparatus 5 and the clamping apparatus 6 are arranged on a frame 10 in the Y-axis direction.

The injecting apparatus 5 includes an injection cylinder 51 that is arranged to extend in the Y-axis direction. The injection cylinder 51 includes a heating device (not illustrated) such as a band heater, and melts a resin introduced from a hopper 53. A screw 51a is integrated into the injection cylinder 51, and by rotation of the screw 51a, plasticizing and measuring the resin introduced into the injection cylinder 51 are performed, and by movement in the axial direction (Y-axis direction) of the screw 51a, it is possible to inject a molten resin from an injection nozzle 52.

In FIG. 2, an example of a shut-off nozzle as the nozzle 52 is illustrated. For an opening/closing mechanism 56 of FIG. 2, a pin 56a for opening/closing the discharge port 52a is arranged. The pin 56a is connected with an actuator (a cylinder) 56c via a link 56b, and by the operation of the actuator 56c the discharge port 52a is opened and closed.

The injection cylinder 51 is supported by a driving unit 54. In the driving unit 54, a motor for plasticizing and measuring the resin by rotationally drive the screw 51a, and a motor for driving the screw 51a to move forward/backward in the axial direction are arranged. The driving unit 54 can move forward/backward in the Y-axis direction along a rail 12 on the frame 10, and in the driving unit 54, an actuator (for example, an electrically driven cylinder) 55 for causing the injecting apparatus 5 to move forward/backward in the Y-axis direction is arranged.

The clamping apparatus 6 performs a clamping and opening and closing of the molds 100A/100B. In the clamping apparatus 6, the following are arranged in order in the Y-axis direction: the fixed platen 61, a movable platen 62, and a movable platen 63. Through platens 61 to 63, a plurality of tie-bars 64 pass. Each of the tie-bars 64 is an axis that extends in the Y-axis direction, one end of which is fixed to the fixed platen 61. Each of the tie-bars 64 is inserted into a respective through hole formed in the movable platen 62. The other end of each of the tie-bars 64 is fixed to the movable platen 63 through an adjusting mechanism 67. The movable platens 62 and 63 can move in the Y-axis direction along a rail 13 on the frame 10, and the fixed platen 61 is fixed to the frame 10.

A toggle mechanism 65 is arranged between the movable platen 62 and the movable platen 63. The toggle mechanism 65 causes the movable platen 62 to move forward/backward in the Y-axis direction in relation to the movable platen 63 (in other words, in relation to the fixed platen 61). The toggle mechanism 65 includes links 65a to 65c. The link 65a is connected rotatably to the movable platen 62. The link 65b is pivotably connected to the movable platen 63. The link 65a and the link 65b are pivotably connected to each other. The link 65c and the link 65b are pivotably connected to each other. The link 65c is pivotably connected to an arm 66c.

The arm 66c is fixed on a ball nut 66b. The ball nut 66b engages a ball screw shaft 66a that extends in the Y-axis direction, and moves forward/backward in the Y-axis direction by rotation of the ball screw shaft 66a. The ball screw shaft 66a is supported such that it is free to rotate by the movable platen 63, and a motor 66 is supported by the movable platen 63. The motor 66 rotationally drives the ball screw shaft 66a while the rotation amount of the motor 66 is detected. Driving the motor 66 while detecting the rotation amount of the motor 66 enables clamping, opening, and closing of the mold 100A/100B.

The injection molding machine 2 includes sensors 68 for measuring a clamping force, where each sensor 68 is, for example, a strain gauge provided on the tie-bar 64, and calculates a clamping force by detecting a distortion of the tie-bar 64.

The adjusting mechanism 67 includes nuts 67b supported to freely rotate on the movable platen 63, motors 67a as driving sources, and transfer mechanisms for transferring the driving force of the motors 67a to the nuts 67b. Each of the tie-bars 64 passes through a hole formed in the movable platen 63, and engages with the nut 67b. By causing the nuts 67b to rotate, the engagement positions in the Y-axis direction between the nuts 67b and the tie-bars 64 change. That is, the position at which the movable platen 63 is fixed in relation to the tie-bar 64 changes. With this, it is possible to cause a space between the movable platen 63 and the fixed platen 61 to change, and thereby it is possible to adjust a clamping force or the like.

The molding operation position 11 is a region between the fixed platen 61 and the movable platen 62.

The mold 100A/100B introduced into the molding operation position 11 are sandwiched between the fixed platen 61 and the movable platen 62 and thereby clamped. Opening and closing in based on movement of the movable mold 102 by movement of the movable platen 62 is performed.

The take-out robot 7 includes a rail 71 that extends in the X-axis direction and a movable rail 72 that can move in the X-axis direction on the rail 71. The movable rail 72 is installed to extend in the Y-axis direction and a slider 73 is provided on the movable rail 72. The slider 73 includes a function for moving in the Y-axis direction guided by the movable rail 72, and a function of moving an elevating shaft 73a up and down in the Z-axis direction. A vacuum head 74 is provided on the lower end of the elevating shaft 73a, and a chuck plate 75 specialized to a molded part is mounted on the vacuum head 74. After opening, the take-out robot 7 moves the vacuum head 74 between the fixed mold 101 and the movable mold 102 as illustrated by the broken lines in FIG. 2 with the rail 71, the movable rail 72, and the slider 73, vacuums the molded part, and conveys it outside the injection molding machine 2. In another exemplary embodiment, the take-out robot is a type that grips the molded part mechanically.

FIG. 3 illustrates an opening portion 61a in a central portion of the fixed platen 61 through which the nozzle 52 moves forward/backward. To the surface on the side of the movable platen 62 (called an inner surface) of the fixed platen 61 a plurality of rollers BR are supported such that they are free to rotate. The plurality of rollers BR rotate around the axis of revolution in the Y-axis direction, and cause movement in the X-axis direction of the mold 100A/100B to be smooth, supporting the bottom surfaces (the bottom surface of the clamping plate 101a) of the mold 100A/100B and supporting the mold 100A/100B from below. On both sides in the X-axis direction of the fixed platen 61, a roller supporting body 620 is fixed, and the plurality of rollers BR are supported by the roller supporting body 620. On the inner surface of the fixed platen 61, grooves 61b that extend in the X-axis direction are formed.

The grooves 61b are formed in two rows separated vertically. On each of the grooves 61b a roller unit 640 is arranged. For the roller unit 640, a plurality of rollers SR are supported such that they are free to rotate. The plurality of rollers SR rotate around the axis of revolution in the Z-axis direction, and guide movement in the X-axis direction of the mold 100A/100B contacting the outer surfaces of the mold 100A/100B (the outer surface of the clamping plate 101a) and supporting the mold 100A/100B from the side. As illustrated in the cross sectional view of the line II-II, while the roller unit 640, by a bias of a spring 641, is positioned at a position at which the roller SR protrudes from the groove 61b, at a time of clamping it is retracted in the groove 61b, and positioned at a position at which the roller SR does not protrude from the groove 61b. The roller unit 640 can prevent the inner surfaces of the mold 100A/100B and the fixed platen 61 from contacting and damaging the inner surfaces at a time of alternating the mold 100A/100B, and the roller unit 640 does not impede the inner surface of the fixed platen 61 and the mold 100A/100B being closed at a time of clamping. On both sides in the X-axis direction of the fixed platen 61, a roller supporting body 630 is fixed, and a plurality of rollers SR are supported by the roller supporting body 630.

On the fixed platen 61, a plurality of fixing mechanisms (clamps) 610 are arranged for fixing the fixed mold 101 to the fixed platen 61. Each fixing mechanism 610 includes an engaging portion 610a that engages with the clamping plate 101a, and a built-in actuator (not illustrated) that moves the engaging portion 610a between an engagement position and an engagement release position.

Note that for the movable platen 62, similarly to the fixed platen 61, a plurality of rollers BR, the roller supporting bodies 620 and 630, the roller unit 640, and the fixing mechanism 610 for fixing the movable mold 102 are arranged.

Figure 4A:
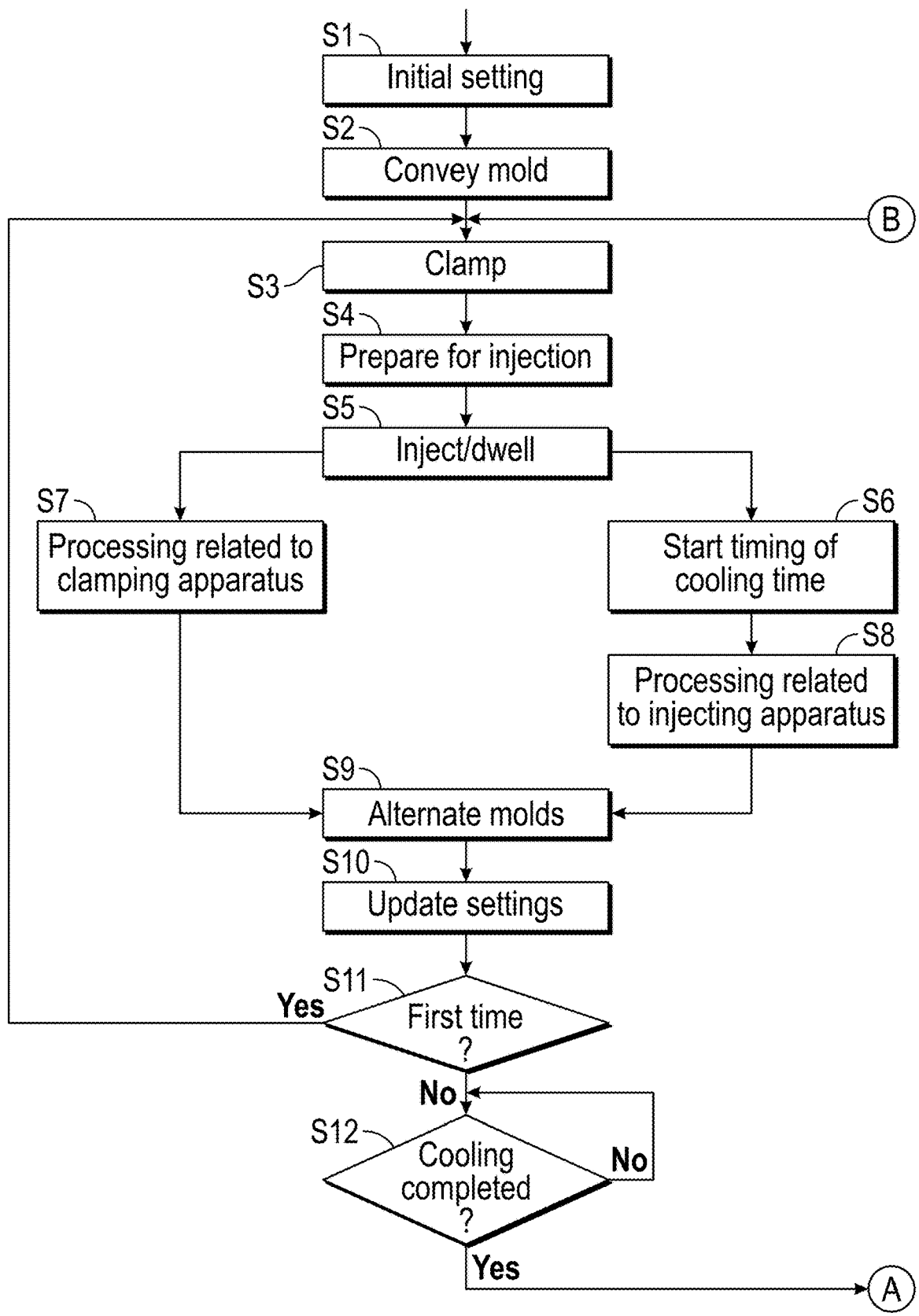
FIG. 4A illustrates a flowchart illustrating a molding process.

FIG. 4A illustrates an example of a known operation of the injection molding system 1 executed by the controller 41. In the following example, a case in which a molding operation is performed while alternating molds 100A and 100B.

An initial setting is performed in step S1. The operation conditions of the injecting apparatus 5 and the clamping apparatus 6 are registered for both molds 100A and 100B. The operation conditions include, but are not limited to, the amount of resin that is injected at one time, the temperature, the injection speed, the clamping force, the initial value of the position of the movable platen 63 in relation to the tie-bars 64, etc. These operation conditions differ even when the mold 100A and the mold 100B are the same type of mold. Because the mold 100A is used for a first molding operation, the operations conditions related to the mold 100A are automatically set as the operation conditions. Heating of the injection cylinder 51 and plasticizing and measuring of the resin and the like for the first time is also started.

In step S2, the mold 100A is conveyed into the injection molding machine 2. The motor 66 is driven to widen the gap between the fixed platen 61 and the movable platen 62 to slightly wider than the thickness of the mold 100A (the width in the Y direction). Next, the controller 41 transmits an instruction to load the mold 100A to the controller 42A, and the controller 42A drives the conveyance unit 31 to load the mold 100A into the molding operation position 11. The mold 100A is unloaded and the mold 100B loaded at the same time. When loading of the mold 100A completes, a signal indicating load completion is transmitted from the controller 42A to the controller 41. When the signal indicating load completion is received, the motor 66 is driven to bring the fixed platen 61 and the movable platen 62 into close contact with the mold 100A. At this time it is not necessary to generate a clamping force as it is generated to occur during a molding. The mold 100A is locked to each of the fixed platen 61 and the movable platen 62 by driving the fixing mechanisms 610.

In step S3, clamping of the mold 100A by the fixed platen 61 and the movable platen 62 is performed by driving the motor 66 to drive the toggle mechanism 65. Preparation for injection in relation to the mold 100A is performed. The actuator 55 is driven to move the injecting apparatus 5, causing the nozzle 52 to contact the mold 100A.

In step S5, injection and dwelling of molten resin is performed. More specifically, the injecting apparatus 5 is driven to fill molten resin into a cavity in the mold 100A from the nozzle 52, and to press the resin in the cylinder 51 into the mold 100A at a high pressure in order to compensate for a volume decrease due to the resin solidifying. The actual clamping force is measured by the sensor 68. During molding, the mold 100A thermally expands due to the temperature of the mold 100A gradually rising, and there are cases where a difference arises in the initial clamping force and the clamping force after some time has passed. Thus, it is possible to correct the clamping force at the time of the next clamping based on a result of measurement by the sensors 68.

The adjustment of the clamping force is performed by an adjustment of the position of the movable platen 63 in relation to the tie-bar 64 by driving the motor 67. This enables enhancing precision of the clamping force by adjusting the clamping force by correcting the initial value of the position of the movable platen 63 in relation to the tie-bars 64 based on the result of measurement by the sensors 68. The adjustment of the position of the movable platen 63 in relation to the tie-bars 64 can be performed at any timing, e.g., at the timing of steps S7 and S9 in FIG. 4A and steps S13-step S15 in FIG. 4B.

The processing of step S6 and step S8 is performed in parallel to step S7. In step S6, the timing of the cooling time for the molded part in the mold 100A is started. In step S7, processing related to the clamping apparatus 6 is performed. More specifically, locking of the mold 100A by the fixing mechanism 610 is released. After a delay of a predetermined time from step S5, the motor 66 is driven to drive the toggle mechanism 65. This results in removal of the clamping force, the movable platen 62 separates slightly in relation to the fixed platen 61, and a space facilitating alternating the molds is formed.

In step S8, processing related to the injecting apparatus 5 is performed. For example, a dwelling suck back, a nozzle shut-off, a retraction of the injecting apparatus 5 or the like are performed. The dwelling suck back and the nozzle shut-off prevent the molten resin from dripping when the nozzle 52 separates from the mold 100A. These processes can be performed during a delay time prior to causing the movable platen 62 to separate slightly in relation to the fixed platen 61 in step S7.

The dwelling suck back reduces the resin pressure in the injection cylinder 51 and in the molds 100A/100B when, after the dwelling, the screw 51a is retracted. The position to which the screw 51a is retracted in the dwelling suck back can be managed as an absolute position, and can be managed as a relative position in relation to a position of the screw 51a after dwelling completion. The screw 51a can be caused to retract until it is detected that the resin pressure measured by a load cell (not illustrated) installed in the injecting apparatus 5 is reduced to a predetermined pressure.

The nozzle shut-off closes the discharge port 52a of the nozzle 52, and in the example of FIG. 2, the pin 56a closes the discharge port 52a. This operation enables suppressing the leaking of resin. The precision of the measuring of the resin can be improved for the next injection. The foregoing processing provides to prevent the resin from leaking, but there are cases where long threadlike resin is generated between the mold 100A/100B and the nozzle 52 due to the structure of the mold 100A/100B or the type of resin. An apparatus for injecting air into the nozzle 52 can be installed to prevent this from occurring.

In step S9, alternation of the molds 100A/100B is performed. The mold 100A is unloaded from the molding operation position 11 to the conveying machine 3A, and the mold 100B is loaded from the conveying device 3B to the molding operation position 11. The controller 41 transmits an instruction to unload the mold 100A to the controller 42A, and the controller 42A drives the conveyance unit 31 to unload the mold 100A from the molding operation position 11. When unloading of the mold 100A completes, a signal indicating unloading completion is transmitted from the controller 42A to the controller 41. The mold 100A is cooled on the conveying machine 3A. At this time, the closed state of the mold 100A is maintained due to the operation of the self-closing unit 103.

When the signal indicating unloading completion is received, the operation conditions for the mold 100B are set as the operation conditions of the molding operation in step S10. For example, the thickness of the mold 100B (the width of the Y direction), the clamping force and the like are set as the operation conditions of the molding operation. Molding conditions such as injection speed, etc. corresponding to the mold 100B are also set. Measurement of plasticization for the next injection is started. The motor 66 is driven to cause the fixed platen 61 and the movable platen 62 to closely contact the mold 100B. At this time, it is not necessary to cause a clamping force as is caused to occur during molding to occur. The mold 100B is locked to both the fixed platen 61 and the movable platen 62 by driving the fixing mechanism 610.

After step S9 in the present embodiment, step S10 is performed. However, since it can take time to switch the molding operation conditions, the molding operation conditions can, for example, be switched simultaneously to the instruction to unload the mold 100A.

In step S11, it is determined whether the molding operation is the first molding operation in relation to the molds 100A and 100B. If the molding operation is the first molding operation, the process returns to step S3. If the molding operation is not the first molding operation, i.e., a second, third, etc. molding operation, the process proceeds to step S12.

The above-described process described a first molding operation. As such, the process returns to step S3. The processing of step S3 to step S8 is then executed for the mold 100B.

After the processing of step S3 to step S8 is executed for the mold 100B, the mold 100B is unloaded in step S9, and loading of the mold 100A is performed. The mold 100B is cooled on the conveying device 3B. In step S11, it is determined that the molding operation is not the first molding operation, and the process proceeds to step S12.

Figure 4B:
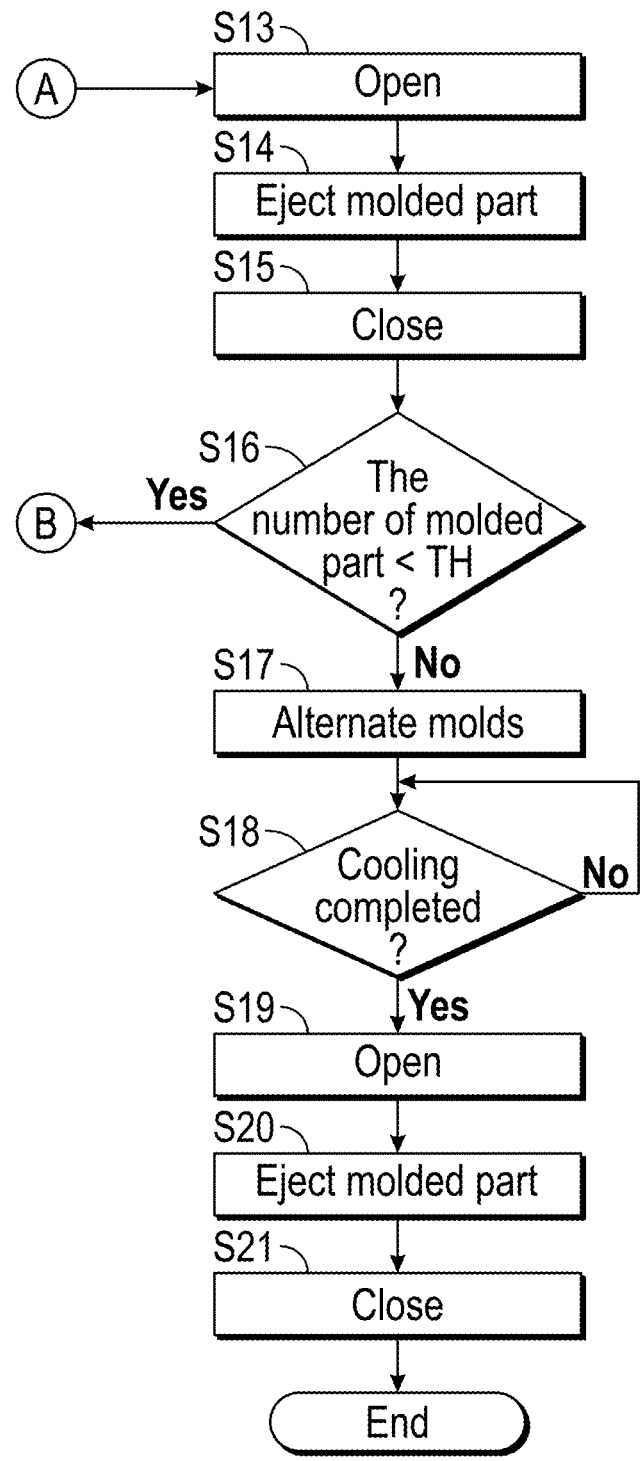
FIG. 4B illustrates an improvement to the molding process in FIG. 4A.

In step S12, it is determined whether the cooling of the mold 100A has been completed based on whether the cooling time from the start of the time measurement in step S6 has reached a predetermined time. If cooling has been completed, the processing of step S13 to step S16 in FIG. 4B is performed.

In step S13, the movable platen 62 is separated from the fixed platen 61 by driving the motor 66. The fixed mold 101 is fixed to the fixed platen 61 by the fixing mechanisms 610, while the movable mold 102 is fixed to the movable platen 62 by the fixing mechanisms 610. Therefore, the movable mold 102 separates from the fixed mold 101 and the mold 100A is opened against a force of the self-closing unit 103. In step S14, the molded part remaining on the side of the movable mold 102 of the mold 100A is removed by driving the take-out robot 7, and conveyed out of the injection molding machine 2. The vacuum head 74 is moved to a position where the chuck plate 75 faces the molded par, and the molded part is secured by a suction force.

In step S15, the movable platen 62 is brought close to the fixed platen 61 by driving the motor 66. The movable mold 102, which was previously separated from the fixed mold 101, closely contacts with the fixed mold 101, and the mold 100A is closed. When the injection molding operation is using mold 100B, steps S13, S14, and S15 are executed to remove molded parts from the mold 100B.

In step S16, the controller 41 compares the number of currently produced molded parts and a threshold value TH. The number of currently produced molded parts is stored in ROM and/or RAM. The threshold value TH is the desired production quantity and is set in step S1. If the number of currently molded parts is less than the threshold value TH, the flow returns to step S3. At that point, the above processing repeats.

If the number of currently molded parts equals the threshold value TH, the flow proceeds to step S17. The processing in steps S17 to S21 is for removing the molded parts from the other mold, e.g., mold 100B.

In step S17, the molds 100A/100B are alternated in the same manner described in step S9. In the present step, the mold 100A is unloaded from the molding operation position 11 to the conveying machine 3A, while the mold 100B is loaded from the conveying device 3B to the molding operation position 11. The controller 41 transmits an instruction to unload the mold 100A to the controller 42A, and the controller 42A drives the conveyance unit 31 to unload the mold 100A from the molding operation position 11. When unloading of the mold 100A completes, a signal indicating unloading completion is transmitted from the controller 42A to the controller 41.

After receipt of the signal indicating unloading completion, in step S18, it is determined whether cooling of the mold 100B has been completed based on whether the cooling time started in step S6 has reached a predetermined time. If the cooling has completed, the process proceeds to step S19.

In step S19, the movable platen 62 is separated from the fixed platen 61 by driving the motor 66. The fixed mold 101 is fixed to the fixed platen 61 by the fixing mechanisms 610, while the movable mold 102 is fixed to the movable platen 62 by the fixing mechanisms 610. The movable mold 102 separates from the fixed mold 101, and the mold 100A is opened against the force of the self-closing unit 103. The molded part remaining on the side of the movable mold 102 of the mold 100A is removed by driving the take-out robot 7 in step S20, and conveyed outside the injection molding machine 2. The vacuum head 74 is moved to a position where the chuck plate 75 faces the molded part and the molded part is secured held by a suction force. In step S21, the movable platen 62 is brought close to the fixed platen 61 by driving the motor 66. The movable mold 102, which was previously separated from the fixed mold 101, closely contacts with the fixed mold 101, and the mold 100A is closed. When the injection molding operation is using mold 100B, steps S19, S20, and S21 are executed to remove molded parts from the mold 100B.

As described above, in the present embodiment, cooling of the molds 100A and 100B is performed on the conveying machines 3A and 3B outside the injection molding machine 2. During cooling of one of the molds 100A and 100B, each process of molded part removal→mold clamping→injection and dwelling is performed by the injection molding machine 2 for the other mold 100A/100B. Since opening and molded part removal are performed by the injection molding machine 2, the conveying machines 3A and 3B do not need to have functions for opening and molded part removal. Thus, it is possible to manufacture a molded part while alternating the molds 100A and 100B with the one injection molding machine 2 while suppressing cost increase of the injection molding system.

If the time required for all processes from the start of the mold replacement process, to the removal process for the other mold, injection process, and dwelling process, and up until completion of the mold replacement process once again fits into the time required for cooling one of the molds 100A or 100B, then productivity compared to normal molding is improved by at least two times. That is, in addition to suppressing cost increases, higher productivity can be achieved.

In order to realize twice the level of productivity, it is sufficient that the cooling time of the molds 100A and 100B cover 50% or more of the total molding process (the time for one molding cycle), but this depends on the time for the mold replacement process. Many molded parts used for exterior covering parts or electromechanical parts, such as for automobiles, home electric appliances, office devices or the like, have a thickness of several millimeters to ensure strength. Thus, during the total molding process, the cooling process covers the longest time, and it is not uncommon for the time to cool the molds 100A and 100B to reach from 50% to 70% in relation to the time for one molding cycle. Therefore, the above-described embodiment is particularly effective in improving productivity of this type of molded part. The productivity can be particularly improved if the time for the molding cycle of the mold 100A and the time for the molding cycle of the mold 100B are approximately the same, while the time for cooling the molds 100A and 100B in relation to the time for one molding cycle is greater than or equal to 50%.

Even if the thickness of the molded part is approximately 1 mm and is comparatively thin, there is a tendency for the cooling process to become longer in cases of parts for which high dimensional precision is required, for molded parts that use a resin for which a high temperature is required as a mold temperature, or for a crystalline resin where cooling is time consuming. In the above-described embodiment, it is possible to realize close to two times the productivity when manufacturing a wide variety of molded parts.

If the time to cool the molds 100A and 100B is less than 50% of the time for one molding cycle, effective application of the time for cooling enables the realization of 1.5 times or 1.8 times higher productivity in relation to normal molding.

Based on the above-described embodiment, the installation space and the power consumption can be reduced due to achieving the productivity of two injection molding machines by the conventional manufacturing method in the one injection molding machine 2.

FIG. 5, FIGS. 6A-6B, FIGS. 7A-7B, and FIGS. 8A-8B illustrate improvements provided by an exemplary embodiment of the present disclosure over current injection molding systems. Components of known injection molding systems are included in the description of Figures FIGS. 5, FIGS. 6A-6B, FIGS. 7A-7B, and FIGS. 8A-8B for description purposes only and will only be discussed as needed.

Figure 5:
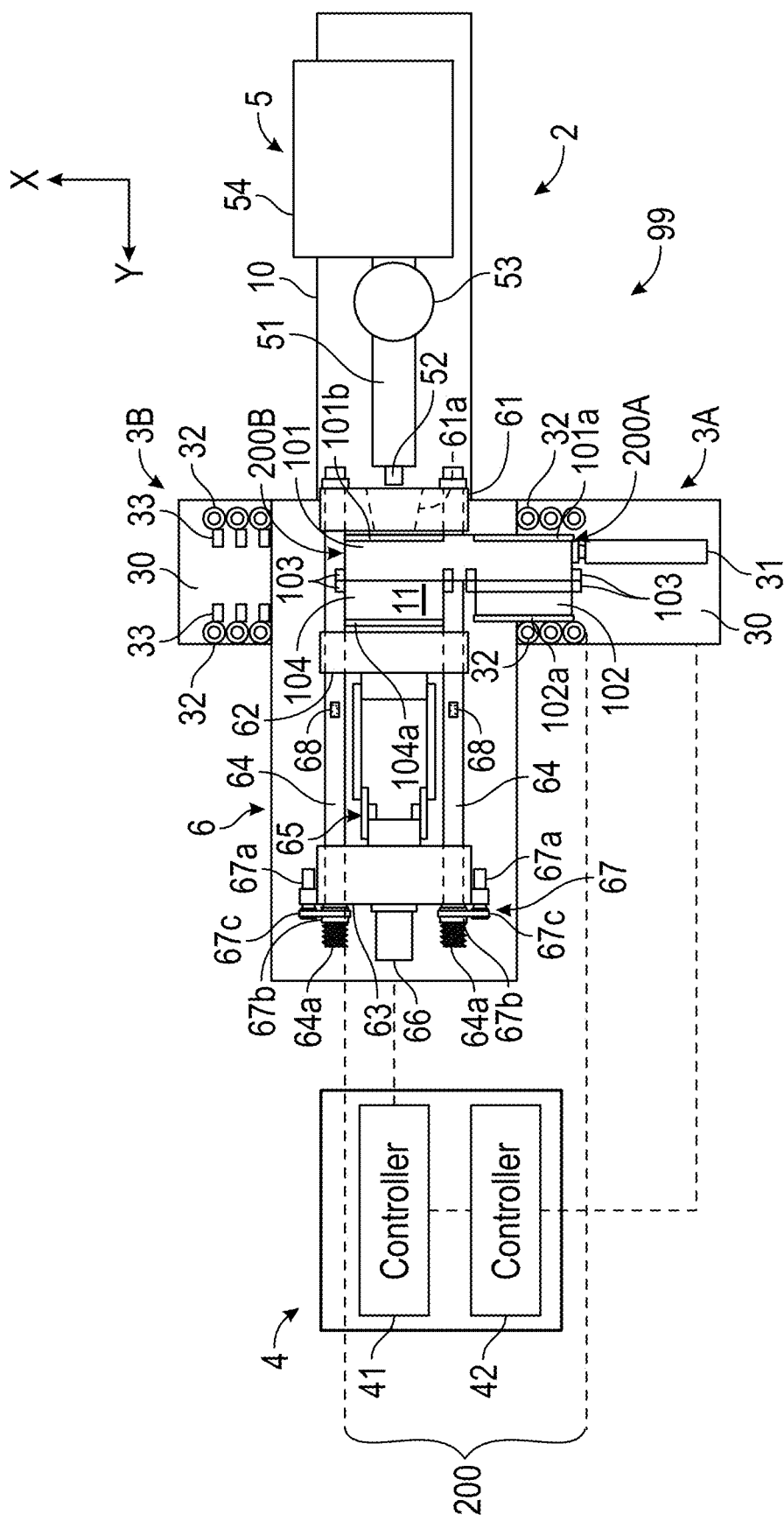
FIG. 5 illustrates an injection molding system according to an exemplary embodiment.

FIG. 5 illustrates an exemplary embodiment of an injection molding system according to the present disclosure. The injection molding system 99 includes a horizontal type injection molding machine 2, conveying machines 3A and 3B, and a control device 4, manufactures molded parts while alternating a plurality of molds by the conveying machines 3A and 3B for the injection molding machine 2.

Mold 200 includes a fixed mold 101 and movable mold 102 and a movable mold 104, which are opened and closed with respect to the fixed mold 101. The fixed mold 101 has a long configuration in the X-axis direction, forms a cavity with the movable mold 102 and the movable mold 104 respectively, and molded parts are molded by injecting a molding material, e.g., molten resin, into these cavities. Hereinafter, the pair of the fixed mold 101 and the movable mold 102 will be referred to as a mold 200A, and the pair of the fixed mold 101 and the movable mold 104 will be referred to as a mold 200B.

Clamping plate 101a and clamping plate 101b are fixed to the fixed mold 101. Clamping plate 102a and clamping plate 104a are fixed to the movable mold 102 and the movable mold 104, respectively. The clamping plates 101a and 102a are used to lock the mold 200A into the molding operation position 11 (mold clamping position) of the injection molding machine 2. The clamping plates 101b and 104a are used to lock the mold 200B into the molding operating position 11 (mold clamping position) of the injection molding machine 2.

The conveying machine 3A carries mold 200A into and out of the molding operation position 11 of the injection molding machine 2. The conveying machine 3B carries mold 200B into and out of the molding operation position 11 of the injection molding machine 2. The conveying machine 3A and the conveying machine 3B sandwich the injection molding machine 2 in the X-axis direction. The molding operation position 11 is positioned between the conveying machine 3A and the conveying machine 3B.

In the injection molding system 2 of FIG. 5, as described above, the components paired with the movable mold 102 and the components paired with the movable mold 104 are integrated to form the single long fixed mold 101 in the X-axis direction. Thus, the mold 200A and the mold 200B can be moved by only one conveyance unit 31.

In the configuration of the present embodiment, the mold 200A and the mold 200B move together. Therefore, the mold 200B is positioned at a cooling position external to the injection molding machine 2 (the conveying machine 3B side) when the mold 200A is positioned at the molding operation position 11. As illustrated in FIG. 5, the mold 200A is positioned at the cooling position external to the injection molding machine 2 (the conveying machine 3A side) when the mold 200B is positioned at the molding operation position 11.

Figure 6A:
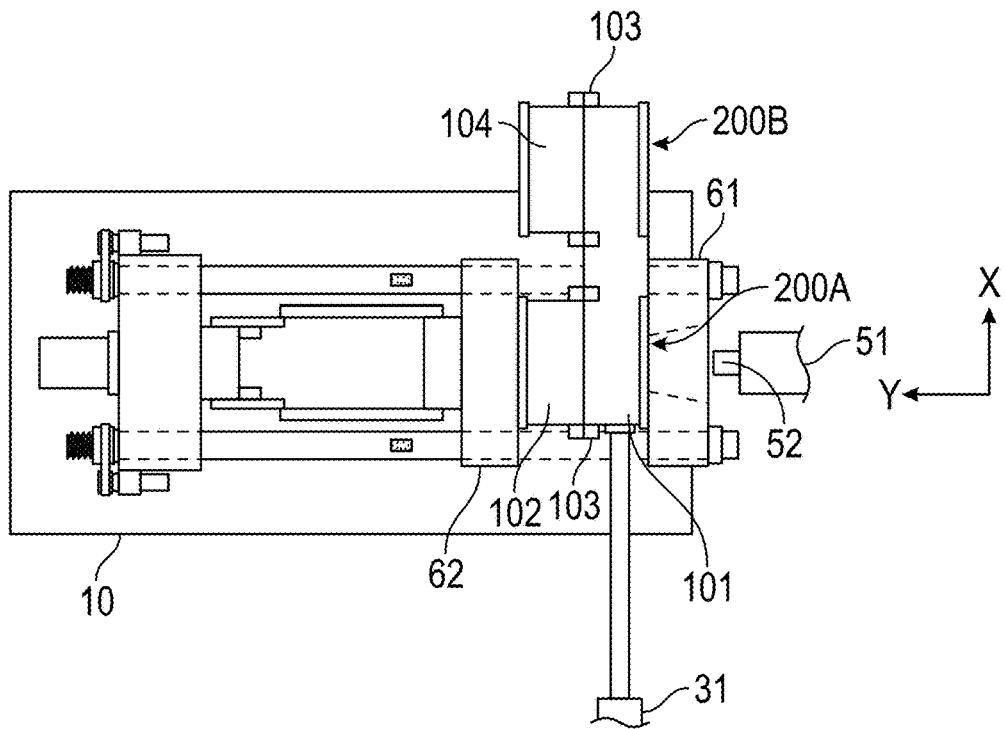
FIGS. 6A-6B illustrate a state for removing a molded part from one set of molds.
Figure 6B:
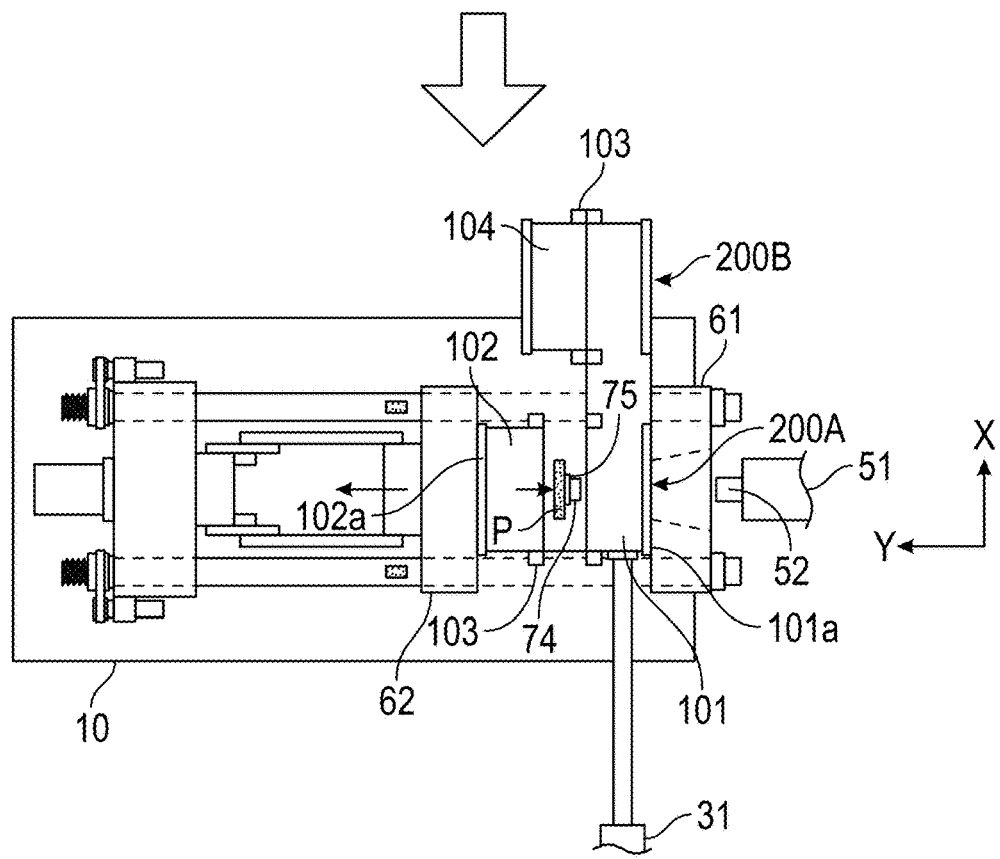

FIGS. 6A and 6B illustrate a state for removing a molded part from mold 200A. For discussion purposes, a part of the conveying machine 3A, the conveying machine 3B, and the injection molding machine 2 is omitted from the figures.

FIG. 6A illustrates a state in which the mold 200A is in the molding operation position 11 and the mold 200B is in the cooling position. In the configuration of the present embodiment, it is possible to shorten the distance between the mold 200A and the mold 200B because the fixed mold paired with the movable mold 102 and the fixed mold paired with the movable mold 104 are integrated as the fixed mold 101. Therefore, as illustrated in FIG. 6A, the mold 200B (part of the fixed mold 101 and the movable mold 104) is stopped on the frame 10 of the injection molding machine 2 at a position partially inside the injection molding machine 2.

The fixed platen 61 adheres closely to the clamping plate 101a and is fixed with respect to the fixed mold 101. The movable platen 62 comes into close contact with the clamping plate 102a and is fixed with respect to the movable mold 102.

FIG. 6B illustrates a state in which the movable mold 102 is separated from the fixed mold 101 by moving the movable platen 62 in the direction of the illustrated arrow, and the mold 200A is opened. The fixed mold 101 and the movable mold 102 form a cavity, and a molded part P is molded in this cavity. Vacuum head 74 is moved to a position where chuck plate 75 faces the molded part P, and the molded part P is secured by the section force generated by the vacuum head 74.

In view of the above-described configuration, even when the movable mold 102 is separated from the fixed mold 101, the movable mold 104 connected via the fixed mold 101 is not affected. Thus, the mold 200B is stopped at the cooling position as illustrated in FIG. 6B.

Figure 7A:
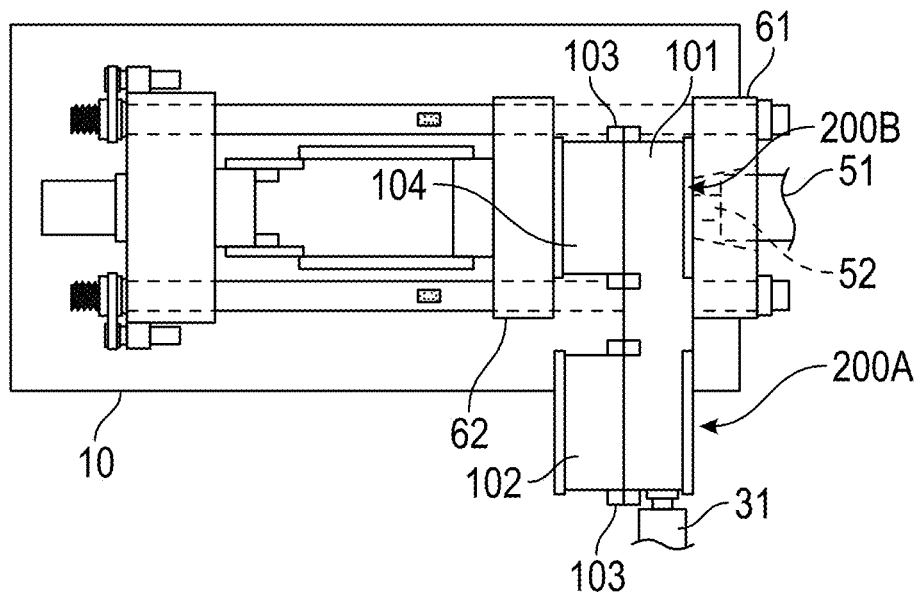
FIGS. 7A-7B illustrate a state for removing a molded part from another set of molds.
Figure 7B:
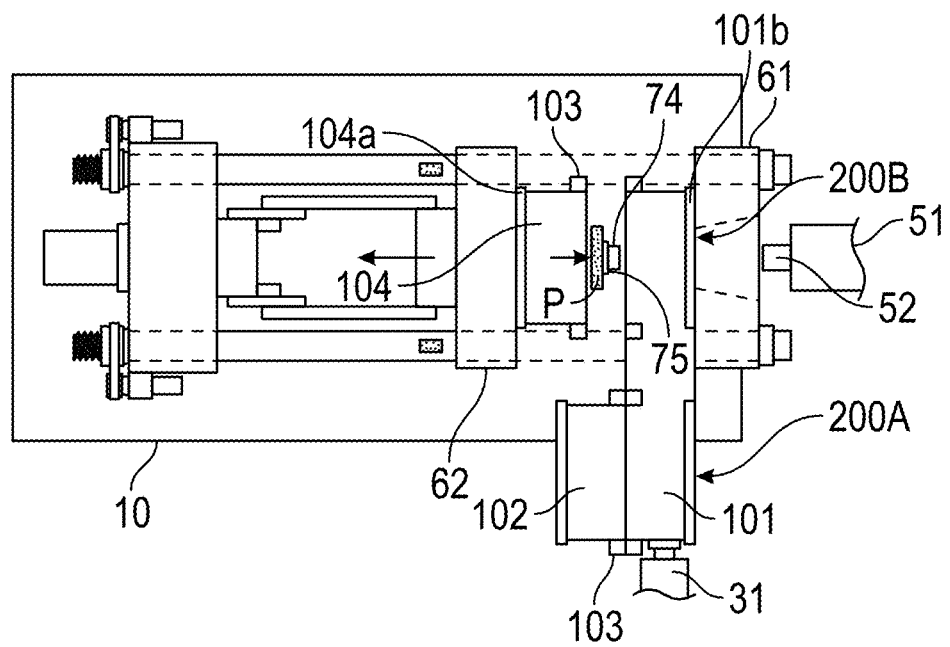

FIGS. 7A-7B illustrate a state for removing a molded part from mold 200B. For discussion purposes, a part of the conveying machine 3A, the conveying machine 3B, and the injection molding machine 2 is omitted from the figures.

FIG. 7A illustrates a state in which the mold 200B is in the molding operation position 11 and the mold 200A is in a cooling position. In the configuration of the present embodiment, it is possible to shorten the distance between the mold 200A and the mold 200B because the fixed mold paired with the movable mold 102 and the fixed mold paired with the movable mold 104 are integrated as the fixed mold 101. Therefore, as illustrated in FIG. 7A, the mold 200A (part of the fixed mold 101 and the movable mold 102) is stopped on the frame 10 of the injection molding machine 2 at a position partially inside the injection molding machine 2.

The fixed platen 61 adheres closely to the clamping plate 101a and is fixed with respect to the fixed mold 101. The movable platen 62 comes into close contact with the clamping plate 104a and is fixed with respect to the movable mold 104.

FIG. 7B illustrates a state in which the movable mold 104 is separated from the fixed mold 101 by moving the movable platen 62 in the direction of the illustrated arrow, and the mold 200B is opened. The fixed mold 101 and the movable mold 104 form a cavity, and a molded part P is molded in this cavity. The vacuum head 74 is moved to a position where the chuck plate 75 faces the molded part P, and the molded part P is secured by the suction force generated by the vacuum head 74.

In view of the above-described configuration, even when the movable mold 104 is separated from the fixed mold 101, the movable mold 102 connected via the fixed mold 101 is not affected. Thus, the mold 200A is stopped at the cooling position as illustrated in FIG. 7B.

As described above, in the present embodiment, the mold 200A and the mold 200B alternately move to the molding operation position 11. Because the fixed mold paired with the movable mold 102 and the fixed mold paired with the movable mold 104 are integrated, the distance between the mold 200A and the mold 200B can be shortened. As a result, each cooling position is located on the frame 10 partially inside the injection molding machine 2.

The distance between the molding operation position 11 and the cooling position can be shortened in the configuration of the present embodiment compared with the configuration where the molds are independent from each other, i.e., a fixed mold paired with a movable mold and another fixed mold paired with another movable mold are not integrated and are separate bodies. Therefore, the time for moving the mold 100 (time for moving the mold 200A to the molding operating position 11 and the mold 200B to the cooling position or the time for moving the mold 200A to the cooling position and the mold 200B to the molding operating position 11) can be shortened compared with the conventional configuration.

Since the cooling position in the present embodiment is closer to the molding operation position 11, the lengths of the conveying machine 3A and the conveying machine 3B in the X-axis direction can be reduced. This enables miniaturization of the injection molding system. In addition, since the lengths of the frame 30 and the like of the conveying machine 3A and the conveying machine 3B are also shortened, the material cost for each of these components can also be reduced.

FIGS. 8A-8B illustrate an internal configuration of mold 200. Mold 200 includes a hot runner (not illustrated), and a heater 105 located internal to the mold 200 as illustrated in FIG. 8A. The heater 105 heats the flow path of the molding material to a cavity, and prevents the molding material from hardening. The heater 105 is provided in the mold 200A and the mold 200B respectively.

As described above, when the mold 200A is in the molding operating position 11, the mold 200B is in the cooling position. In order to prevent heat generated by the heater 105 located in the mold 200A being transmitted through the fixed mold 101 to the mold 200B in the cooling position, a heat insulating material 106 is used as illustrated in FIG. 8A. In particular, the heat insulating material 106 inserted into a boundary located between the mold 200A and the mold 200B. As a result, heat transfer can be interrupted and the quality of a molded part can be prevented from deteriorating.

In another exemplary embodiment, an air layer 107 can be formed by partially removing the boundary between the mold 200A and the mold 200B as illustrated in FIG. 8B. In this case, in a state where the movable mold 102 and the movable mold 104 are in close contact with each other with respect to the fixed mold 101, the inner portion of the mold 200 is removed in consideration of the strength of the fixed mold 101, so that the mold 200 can be moved.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An injection molding system comprising:
   an injection molding machine configured to perform an injection molding with a mold, wherein the injection molding machine includes an injection nozzle; and
   a conveying machine configured to convey the mold on a first axis,
   wherein the mold includes:
     a first member;
     a second member configured to form a first cavity corresponding to a first molded part by combining the second member with the first member; and
     a third member configured to form a second cavity corresponding to a second molded part by combining the third member with the first member,
   wherein the conveying machine includes a frame, wherein a first portion of the frame is positioned on a first side of the injection molding machine, and wherein a second portion of the frame is positioned on a second side of the injection molding machine that is opposite to the first side, such that the injection molding machine is positioned between the first portion and the second portion of the frame of the conveying machine,
   wherein, when the second member is positioned at a molding operation position, the first member is positioned between the second member and the injection nozzle,
   wherein, when the third member is positioned at the molding operation position, the first member is positioned between the third member and the injection nozzle,
   wherein the injection molding machine is configured to move the second member and the third member on a second axis that is perpendicular to the first axis,
   wherein the conveying machine is configured to convey the mold so that when one of the second member and the third member is positioned at the molding operation position for injecting resin into a corresponding cavity, the other of the second member and the third member is positioned at a respective cooling position for cooling resin injected into a corresponding cavity,
   wherein when the second member is positioned at the respective cooling position of the second member, the second member is vertically supported by both a frame of the injection molding machine and the first portion of the frame of the conveying machine such that, when viewed in a direction perpendicular to both the first axis and the second axis, the second member overlaps both the frame of the injection molding machine and the first portion of the frame of the conveying machine, and
   wherein when the third member is positioned at the respective cooling position of the third member, the third member is vertically supported by both the frame of the injection molding machine and the second portion of the frame of the conveying machine such that, when viewed in the direction perpendicular to both the first axis and the second axis, the third member overlaps both the frame of the injection molding machine and the second portion of the frame of the conveying machine.

2. The injection molding system according to claim 1, wherein the first member is a fixed member fixed to a fixed platen of the injection molding machine.

3. The injection molding system according to claim 1,
   wherein the second member is a movable member that moves to facilitate removal of the first molded part from the first cavity, and
   wherein the third member is a movable member that moves to facilitate removal of the second molded part from the second cavity.

4. The injection molding system according to claim 3, wherein the second member and the third member move independently of each other.

5. The injection molding system according to claim 1, further compromising a heat insulating structure configured to provide insulation between the first cavity and the second cavity.

6. The injection molding system according to claim 5, wherein the heat insulating structure is a hollow structure, and wherein a heat insulating material is provided in the heat insulating structure.

7. The injection molding system according to claim 5, wherein the heat insulating structure is a hollow structure configured to form an air layer between the first and second cavity.

8. The injection molding system according to claim 1, further compromising:
a first heater for heating a molding material to flow into the first cavity; and
a second heater for heating a molding material to flow into the second cavity.

9. An injection molding system comprising:
a mold;
a conveying machine configured to move the mold on a first axis; and
an injection molding apparatus configured to inject resin into the mold, wherein the injection molding machine includes an injection nozzle,
wherein the mold includes:
 a first member;
 a second member configured to combine with the first member to form a first cavity corresponding to a first molded part; and
 a third member configured to combine with the first member to form a second cavity corresponding to a second molded part,
wherein the conveying machine includes a frame, wherein a first portion of the frame is positioned on a first side of the injection molding machine, and wherein a second portion of the frame is positioned on a second side of the injection molding machine that is opposite to the first side, such that the injection molding machine is positioned between the first portion and the second portion of the frame of the conveying machine,
wherein, when the second member is positioned at a molding operation position, the first member is positioned between the second member and the injection nozzle,
wherein, when the third member is positioned at the molding operation position, the first member is positioned between the third member and the injection nozzle,
wherein the injection molding machine is configured to move the second member and the third member on a second axis that is perpendicular to the first axis,
wherein the conveying machine is configured to convey the mold between a position at which the second member is positioned at the molding operation position for injecting resin into the first cavity and a position at which the third member is positioned at the molding operation position for injecting resin into the second cavity,
wherein in the position at which the second member is positioned at the molding operation position, the third member is positioned at a first cooling position where the third member is supported by both a frame of the injection molding machine and the second portion of the frame of the conveying machine such that, when viewed in a direction perpendicular to both the first axis and the second axis, the third member overlaps both the frame of the injection molding machine and the second portion of the frame of the conveying machine, and
wherein in the position at which the third member is positioned at the molding operation position, the second member is positioned at a second cooling position where the second member is supported by both the frame of the injection molding machine and the first portion of the frame of the conveying machine such that, when viewed in the direction perpendicular to both the first axis and the second axis, the second member overlaps both the frame of the injection molding machine and the first portion of the frame of the conveying machine.

10. The injection molding system according to claim 1, wherein an actuator for conveying the mold is placed on the first portion of the frame of the conveying machine, and
wherein the actuator is connected with the first member included in the mold.

11. The injection molding system according to claim 1, wherein the injection molding machine includes respective rollers,
wherein the first portion of the frame of the conveying machine includes respective rollers,
wherein the second portion of the frame of the conveying machine includes respective rollers,
wherein, when the second member is positioned at the respective cooling position of the second member, the second member is vertically supported by some of the respective rollers of the injection molding machine and by some of the respective rollers of the first portion of the frame of the conveying machine, and
wherein, when the third member is positioned at the respective cooling position of the third member, the third member is vertically supported by some of the respective rollers of the injection molding machine and by some of the respective rollers of the second portion of the frame of the conveying machine.

12. The injection molding system according to claim 1, wherein, when viewed in the direction perpendicular to both the first axis and the second axis, at least one fourth of a length of the second member along the first axis overlaps the frame of the injection molding machine and at least one fourth of the length of the second member along the first axis overlaps the first portion of the frame of the conveying machine, and
wherein, when viewed in the direction perpendicular to both the first axis and the second axis, at least one fourth of a length of the third member along the first axis overlaps the frame of the injection molding machine and at least one fourth of the length of the third member along the first axis overlaps the second portion of the frame of the conveying machine.

13. The injection molding system according to claim 9, wherein the first member is fixed to a fixed platen of the injection molding apparatus.

14. The injection molding system according to claim 9, wherein the second member is a movable member that is configured to move to facilitate removal of the first molded part from the first cavity, and
wherein the third member is a movable member that is configured to move to facilitate removal of the second molded part from the second cavity.

15. The injection molding system according to claim 14, wherein the second member and the third member are configured to move independently of each other.

16. The injection molding system according to claim 9, further compromising a heat insulating structure configured to provide insulation between the first cavity and the second cavity.

17. The injection molding system according to claim 16, wherein the heat insulating structure is a hollow structure, and wherein a heat insulating material is provided in the heat insulating structure.

18. The injection molding system according to claim 16, wherein the heat insulating structure is a hollow structure configured to form an air layer between the first and second cavity.

19. The injection molding system according to claim 9, further compromising:
   a first heater for heating a molding material to flow into the first cavity; and
   a second heater for heating a molding material to flow into the second cavity.

20. The injection molding system according to claim 9, wherein an actuator for conveying the mold is placed on the frame of the conveying machine, and
   wherein the actuator is connected with the first member included in the mold.

* * * * *